United States Patent Office 3,508,597
Patented Apr. 28, 1970

3,508,597
REINFORCED ELASTOMERIC PRODUCTS CONTAINING CALCIUM OXIDE AND ALUMINUM OXIDE
Yathiraja Iyengar, Newark, Del., assignor to E. I. du Pont de Nemours and Company, Wilmington, Del., a corporation of Delaware
No Drawing. Continuation-in-part of abandoned application Ser. No. 237,758, Nov. 14, 1962. This application Sept. 16, 1965, Ser. No. 487,888
Int. Cl. B60c 1/00; B29h 9/60; C08c 11/08
U.S. Cl. 152—357   17 Claims This application is a continuation-in-part of applicant's copending application, Ser. No. 237,758 filed Nov. 14, 1962, now abandoned.

This invention relates generally to textiles and, more particularly, to elastomeric products reinforced with polymeric textile structures.

The practic of reinforcing pneumatic tires, conveyor belts, drive belts, hoses, and similar elastomeric articles with textile cords and yarn structures is well known. It is also well known that synthetic polymer yarns and cords such as polyamides and polyesters are useful and have been widely accepted as replacements for cotton and rayon in such elastomeric articles. Although the performance at high temperatures of these synthetic polymer yarns and cords is better than rayon, exposure to heat remains as a limitation on increased utility of these synthetic polymer structures as reinforcements. Another limitation is the moisture content of cords and of elastomer stocks. The combination of heat and moisture is deleteriosu to both the reinforcing structure and to the elastomer stock. Calcium oxide is a well known desiccant, but the addition of calcium oxide to rubber stocks, based on natural or synthetic rubbers, reduces the scorch time, the modulus, and the cord/elastomer adhesion.

The most important objective of the present invention is to provide more useful elastomeric products reinforced with textile structures prepared from polyamide and polyester yarns.

Another objective of this invention is to provide novel elastomeric products reinforced with textile structures of polyamide and polyester yarns that have an acceptable modulus.

Another objective of this invention is to provide novel elastomeric products reinforced with polyamide and polyester yarns which have acceptable cord/elastomer adhesion.

Another objective of this invention is to provide novel elastomeric products reinforced with polyamide and polyester yarns that have an acceptable scorch time.

A further objective of this invention is to provide improvements in the procedures followed in the preparation of such products. Other objectives will appear hereinafter.

These objectives are accomplished in the construction of an elastomeric product, reinforced with synthetic polymer textile structures, by dispersing in the skim stock for said elastomeric product (1) from about 3 to 30 parts calcium oxide per 100 parts of rubber in said skim stock, and (2) from about 10 to 30 parts per hundred parts of rubber in said skim stock of a modifier for the calcium oxide selected from the class consisting of activated aluminum oxide and zinc oxide. When the term "skim stock" is used herein, reference is made to the compounded material which is to be reinforced with said synthetic textile structure. The modifier must be added before the addition of calcium oxide. If both zinc oxide and activated aluminum oxide are added together before the addition of CaO, the stock tensile properties are improved. The synthetic polymer for this invention is either a polyamide or a polyester. When the article is a tire or the like and includes several layers of different stocks, the calcium oxide and the modifier are dispersed in the stock which is in contiguous relationship to the reinforcement cords, i.e., that stock which is spaced not more than 60 mils from the cords.

The amount of the desiccant, calcium oxide, to be added is proportional to the amount of moisture in the elastomer stock, in the cords, or in the immediate environment of elastomer product fabrication. The amount of modifier to be added is proportional to the amount of desiccant.

In the preferred mixing procedure, a three-step Banbury (or milling) process is used in which all ingredients except sulfur, accelerator, modifier, and desiccant are added in step 1 (with carbon black mixed in two installments). In step 2, the modifier is added, then the temperature is allowed to rise (due to the work of mixing) to about 290° F., and finally CaO is added. Sulfur and accelerator are added in step 3 at 230° F.

The calcium oxide and the modifier are to be added to the stock that is in coniguous relationship to the reinforcing textile structure in order to secure the optimum properties for the elastomeric product. Calcium oxide and modifier may also be added, each in concentrations up to 50 phr. (parts per hundred of rubber), to that section of a pneumatic tire innerliner that is included within a 60-mil distance from the reinforcing structure. Therefore, a dual-layer innerliner would be provided. The advantages for this invention are not obtained when the calcium oxide and the modifier are added only to the stock beyond the above-specified limit of about 60 mils. In fact, it has been determined that when calcium oxide and the modifier in the concentrations of this invention are added to stock located beyond the above-specified limit of about 60 mils, for example, in the tread stock of a pneumatic tire, there is a deleterious effect on said distant stock so that the net results of adding the calcium oxide with the modifier to the distant stock is to effect a net decrease in over-all utility of the elastomeric article. Addition, per 100 parts of rubber in the skim stock of more than 30 parts calcium oxide and more than about 30 parts modifier within the aforementioned 60-mil limit of the skim stock is undesirable.

The following examples illustrate the novel and more useful products and processes of this invention.

EXAMPLE I

A 3:1 suspension of calcium oxide in "Sundex 41" (an aromatic plasticizing oil consisting of a blend of high molecular weight petroleum fractions with asphaltum) and powdered zinc oxide is dispersed in an otherwise conventional skim stock formulation (50% natural rubber and 50% styrene-butadiene rubber) except that the conventional volume of plasticizing oil is reduced to off-set the volume of the mineral oil. Following the dispersion, the stock contains 30 parts carbon black (FEF), 10 parts calcium oxide, and 30 parts zinc oxide per 100 parts of rubber. The resulting stock is calendered by conventional methods to a 12-mil thick sheet and used to form plies in the building of a standard 8.50–14 four-ply tire reinforced with cords fabricated from filaments spun from an 80/20 blend by weight of polyhexamethylene adipamide and polyhexamethylene isophthalamide (British specification No. 918,637). Another tire of the same dimensions is also built using identical cords, and skim stock of the same composition, except that the concentration of zinc oxide is 3 parts per 100 parts of rubber which is the conventional concentration of zinc oxide used in conventional skim stock as an activator of the accelerator used in vulcanization. A concentration of zinc oxide larger than 3% has no increased effect as an activator. A control tire of the same dimensions is also built using identical cords, and skim stock of the same composition, except for the omission of the calcium oxide and the use of only 3 parts of zinc oxide per 100 parts of rubber. The properties of these three tires and of the skim stock are recorded in the following table:

TABLE I

| CaO content (phr.) | ZnO content (phr.) | Skim stock properties | | | Tire properties | | |
|---|---|---|---|---|---|---|---|
| | | Scorch time (min.) | 300% modulus (psi) | H-Pull (lbs.) 25°C./140° C. | Flat-spot (mils) | HSE test | |
| | | | | | | Miles | CAT° F |
| 10 | 30 | 44 | 1,560 | 29/12 | 97 | 2,780 | 222 |
| 10 | 3 | 38 | 1,100 | 20/10 | 98 | 670 | 232 |
| 0 | 3 | 43 | 1,450 | 30/10 | 126 | 3,000 | 201 | phr.=Parts per 100 of rubber.
CAT=Contained air temperature.
HSE=High Speed Endurance Wheel Test.

Similar durability of pneumatic tires made with this stock is attained when the cords are fabricated with filaments spun from polyhexamethylene adipamide alone, and also attained when the cords are of filaments from polycaproamide.

Flat-spot is a temporary phenomenon exhibited by conventional nylon tires whereby, as the tire cools after use, a flatness develops on the tire surface which is in contact with the road and this flatness persists until the tire is again placed in use. After a few minutes of operation, the flat-spot is not evident. For the brief time that a car operates with a flat-spot, a thumping sound is heard, and the riding characteristics are not those that are preferred by the discriminating passenger.

Flat-spot is specified in mils (thousandths of an inch) and is the measure of the net out-of-roundness at the area of contact of the cool tire with the road. To determine flat-spot in a laboratory, a tire is heated in an oven at 170° F. and the unloaded out-of-roundness is measured. Then, the tire is loaded against a flat surface with 90% of the maximum permissible load specified in the 1962 Tire and Rim Association (2001 First National Tower, Akron 8, Ohio) Yearbook, and allowed to cool for two hours. The out-of-roundness is measured again, this time corrected for the over-all shrinkage of the tire, and the difference between the loaded and unloaded out-of-roundness is the flat-spot. Acceptable riding characteristics are derived when using tires whose flat-spot is no more than about 160 mils. However, with increasing improvements in automobile suspension systems and progressively superior highways which together tend to accentuate tire shortcomings, a flat-spot not more than about 120 mils has become preferred. It is believed that the relatively low dimensional stability, low modulus, and high growth of conventional polyamide yarns contribute to this flat-spotting phenomenon and that the presence of moisture accentuates the flat-spotting. The 80/20 blend of polyamides used for the cords of this example usually provides a flat-spot in the preferred range, but for removal of moisture accumulated in storage and even in tire manufacturing, as well as for retaining tire durability, calcium oxide and the modifier of this invention is a useful combination for tires containing these cords. Of the three polyamides used for this example, the lowest flat-spot is attained with the 80/20 blend and the least acceptable flat-spot is experienced with polycaproamide. These melt-blends (disclosed in British Patent No. 918,637) are examples of recently developed melt-blends of synthetic polymers.

The HSE data is from tests carried out in a High Speed Endurance Wheel Test, conditions of which are described in the transactions of the ASME, Vol. 82 (1960), series B, No. 1, pages 23–28. The tires in this example are tested at 110% load, 75 m.p.h., for 3,000 miles, or failure, whichever is earlier. The CAT is measured continuously with thermocouples in a slip-ring arrangement during the High Speed Endurance Wheel test. rangement during the High Speed Endurance Wheel Test. 3,000 miles, or tire failure, whichever occurs first. A high CAT is an indication of poor tire durability.

Scorch time is the time required by an elastomer stock to change from a flowable to a non-flowable condition. A short scorch time would interfere with successful processing and vulcanization of rubber stocks. Scorch time is determined by using the procedure of A.S.T.M. Std., D–927–57–T.

300% modulus, based on the original cross-section, is measured when the strain on the elastomer is 300% of the original length and is determined by using the procedure of A.S.T.M. Std., D–412–51–T. This modulus is proportional to the degree of cross-linking of the elastomer.

H-Pull is determined by first forming an H structure wherein the yarn being tested, dipped in a conventional resorcinol formaldehyde adhesive system, takes the position of the horizontal bar in the H, and two ¼ inch wide pieces of elastomer take the position of the two vertical legs of the H so that the outer surfaces of this H are approximately ¼ inch apart. This H is cured at 150° C., 18 tons pressure for about 40 minutes. The H-Pull is the force applied, when the H is at the indicated temperature, necessary to separate either vertical leg from the yarn, and is therefore a measure of the in-service-adhesion between the yarn and the elastomer.

Table I shows that the addition of calcium oxide to skim ruber stocks shortens scorch time, mreduces modulus, and weakens cord elastomer adhesion and that modification of this stock with 30 parts of zinc oxid per 100 of rubber restores these properties, and retains the low flat-spot achieved with calcium oxide alone. The poor durability of the low flat-spotting tires with stocks containing calcium oxide alone is markedly improved by using zinc oxide modified stocks which also contain calcium oxide. Thus, the tires from these modified stocks have the unique combination of a low flat-spot and good durability.

EXAMPLE II

Powdered calcium oxide and powdered activated aluminum oxide are both dispersed in a conventional skim stock formulation (50% natural rubber and 50% styrene-butadiene rubber). Following the dispersion, the stock contains, per 100 parts of rubber, 25 parts carbon black (FEF), 10 parts calcium oxide, 15 parts activated aluminum oxide, 2 parts N-oxydiethylene benzothiazole-2-sulfeneamide accelerator, 0.4 part benzothiazyl disulfide accelerator, 3 parts zine oxide, 2.5 parts sulfur, 1 part stearic acid and 5 parts aromatic processing oils. The restulting stock is calendered by conventional methods to a 12-mil thick sheet which is used to form plies in the building of a standard 8.50–14 four-ply tire reinforced with cords fabricated from filaments spun from an 80/20 blend by weight of polyhexamethylene adipamide and polyhexamethylene isophthalamide. Another tire of these same dimensions is also built using identical cords, and skim stock of the same composition except for the omission of the activated aluminum oxide. A control tire of the same dimensions is also built using identical cords and skim stock of the same composition except for the omission of the calcium oxide and of the activated aluminum oxide. Properties of these three tires and of the skim stock are recorded in Table II. It should be noted that a slightly higher than conventional concentration of accelerator is used when activated $Al_2O_3$ is the modifier for this invention.

When the same stocks as specified above are used to construct more test pneumatic tires with the same dimensions as the test tires specified above, but with cords of all polyhexamethylene adipamide, tire properties are determined that are specified in Table II-a. The skim stock properties for the tires with cords of all polyhexamethylene adipamide are the same as the skim stock properties for the tires with cords of the 80/20 blend specified above. Similar durability of pneumatic tires made with this stock is attained when the cords are fabricated with filaments spun from polycaproamide.

TABLE II

| CaO content (phr.) | Activated $Al_2O_3$ content (phr.) | Skim stock properties | | | Tire Properties | | |
|---|---|---|---|---|---|---|---|
| | | Scorch time (min.) | 300% modulus (p.s.i.) | H-Pull (lbs.) 25° C./140° C. | Flat-spot (mils) | HSE test | |
| | | | | | | Miles | CAT, °F |
| 10 | 15 | 48 | 990 | 26/12 | 109 | 3,000 | 200 |
| 10 | 0 | 38 | 920 | 14,9 | 110 | 650 | 230 |
| 0 | 0 | >45 | 1,140 | 28/10 | 131 | 3,000 | 204 | phr. = Parts per 100 of rubber.
CAT = Contained air temperrure.
HSE = High Speed Endurance Wheel Test.

TABLE II-a

| CaO content (phr.) | Activated $Al_2O_3$ Content (phr.) | Tire properties | | |
|---|---|---|---|---|
| | | Flat-spot (mils) | HSE test | |
| | | | Miles | CAT °F. |
| 10 | 15 | 141 | 3,000 | 215 |
| 15 | 0 | 142 | 972 | 223 |
| 0 | 0 | 189 | 3,000 | 212 |

When the elastomeric product of this invention is a pneumatic tire, the preferred cords are those fabricated from filaments spun from melt blends of polyhexamethylene adipamide (95–50%) with polyhexamethylene isophthalamide (5–50%), polyhexamethylene 5-t-butyl isophthalamide (5–50%), or a copolymer (5–50%) of hexamethylene 5-t-butyl isophthalamide and hexamethylene isophthalamide (1.5–30%).

Although pneumatic tires with polyester cords do not show a flat spot in the higher range shown by polyamide, the combination of calcium oxide and the modifier, according to this invention, is quite useful for elastomer products reinforced with polyester structure. Calcium oxide lowers the conventional loss of cord strength in cured elastomeric products reinforced with polyester structures, and the modifier of this invention not only improves the rubber stock properties that are made less acceptable by the calcium oxide, but the combination actually betters the adhesion of polyester with elastomer stock. It will be apparent, therefore, that while the invention has been illustrated in the examples by the use of various polyamides, these may be substituted by polyester structures such as those given below with comparable advantages.

For conveyor belts, drive belts, hoses, and the like, the combination of this invention is useful for lowering the elongation, increasing the adhesion, and retaining the high modulus of polyamide and polyester structures used for reinforcing these elastomeric articles.

In addition to the preferred polyamide structures specified above, structures that are prepared from filaments of polyundecanoamide, polyhexamethylene sebacamide, polymetaxylylene adipamide, polyhexamethylene-t-butyl isophthalamide, polymetaxylylene sebacamide, and copolyamides and blends thereof may be used in the practice of this invention.

Typical examples of polyester structures that may be used in th practice of this invention are structures that are prepared from filaments of polyethylene terephthalate, polymethylene terephthalate, polyethylene isophthalate, polyhexahydro-p-xylene terephthalate, polyesters from naphthalene dicarboxylic acids, polyesters where bibenzoic acid is a replacement for terephthalic acid, and copolymers thereof. The preferred polyesters for this invention is polyethylene terephthalate.

It is apparent that many variations in the size, shape, and configuration of reinforced elastomeric articles and in the procedures followed in their fabrication may be adapted without departing from the spirit of the present invention which is therefore intended to be limited only by the scope of the appended claims.

What is claimed is:

1. A composition comprising a vulcanizable rubbery polymer containing, based on 100 parts by weight of said rubbery polymer, about 3 to 12 parts by weight of finely divided CaO and about 10 to 25 parts by weight of $Al_2O_3$, the amount of $Al_2O_3$ being in excess of the amount of CaO.

2. A composition as defined in claim 1 wherein said CaO is about 5 to 10 parts by weight and said $Al_2O_3$ is about 10 to 20 parts by weight.

3. A composition as defined in claim 1 wherein said CaO is about 7.5 parts by weight and said $Al_2O_3$ is about 15 parts by weight.

4. A vulcanizable carcass composition for pneumatic rubber tires containing per 100 parts by weight of rubbery polymer about 3 to 12 parts by weight of CaO and an amount of $Al_2O_3$ substantially greater than the amount of calcium oxide.

5. A rubberized laminate comprising one or more layers of textile tire cords coated with a rubber composition having dispersed therein, based on 100 parts by weight of rubber in said composition, about 3 to 12 parts by weight of finely divided CaO and about 10 to 25 parts by weight of $Al_2O_3$, the amount of $Al_2O_3$ being in excess of the amount of CaO.

6. A rubberized laminate comprising one or more layers of tire cords formed of textile fibers of the group consisting of nylon and polyesters, said cords being coated with a rubber composition having dispersed therein, based on 100 parts by weight of rubber in said composition, about 3 to 12 parts by weight of finely divided CaO and about 10 to 25 parts by weight of $Al_2O_3$, the amount of $Al_2O_3$ being in excess of the amount of CaO.

7. A laminate as defined in claim 6 wherein said CaO is about 5 to 10 parts by weight and said $Al_2O_3$ is about 10 to 20 parts by weight.

8. In a pneumatic rubber tire, the improvement which comprises a carcass portion having one or more layers of tire cords formed of textile fibers of the group consisting of nylon and polyesters, said cords being coated with a rubber composition having dispersed therein, based on 100 parts by weight of rubber, about 3 to 12 parts by weight of finely divided CaO and about 10 to 25 parts by weight of $Al_2O_3$, the amount of $Al_2O_3$ being in excess of the amount of CaO.

9. A pneumatic tire having a carcass portion having one or more layers of nylon cords coated with a rubber composition having dispersed therein, based on 100 parts by weight of rubber, about 3 to 12 parts by weight of finely divided CaO, and about 10 to 25 parts by weight of finely divided $Al_2O_3$, the amount of $Al_2O_3$ being in excess of the amount of CaO.

10. A pneumatic tire as defined in claim 9 wherein the amount of said CaO is about 5 to 10 parts by weight and the amount of said $Al_2O_3$ is about 10 to 20 parts by weight.

11. A pneumatic tire as defined in claim 9 wherein the amount of said CaO is about 7.5 parts by weight and the amount of said $Al_2O_3$ is about 15 parts by weight.

12. A pneumatic tire having a carcass portion having one or more layers of polyester cords coated with a rubber composition having dispersed therein, based on 100 parts by weight of rubber, about 3 to 12 parts by weight of finely divided CaO, and about 10 to 25 parts by weight of finely divided $Al_2O_3$, the amount of $Al_2O_3$ being in excess of the amount of CaO.

13. A pneumatic tire as defined in claim 12 wherein the amount of said CaO is about 5 to 10 parts by weight and the amount of said $Al_2O_3$ is about 10 to 20 parts by weight.

14. A pneumatic tire as defined in claim 12 wherein the amount of said CaO is about 7.5 parts by weight and the amount of said $Al_2O_3$ is about 15 parts by weight.

15. In a method of making a tire, the improvement comprising the steps of:
(a) preparing a vulcanizable ply stock composition comprising rubber having dispersed therein, based on about 100 parts by weight of said rubber, about 3 to 12 parts by weight of finely divided CaO and about 10 to 25 parts by weight of $Al_2O_3$, the amount of $Al_2O_3$ being in excess of the amount of CaO,
(b) reinforcing a layer of tire cords, formed from textile fibers of the group consisting of nylon and polyesters, with said composition, and
(c) assembling one or more plies of said rubberized cords to form a tire carcass.

16. In a method of making a tire, the improvement comprising the steps of:
(a) preparing a vulcanizable ply stock composition comprising rubber having dispersed therein, based on about 100 parts by weight of said rubber, about 3 to 16 parts by weight of a suspension of finely divided CaO in an oil that is compatible with said rubber, and about 10 to 25 parts by weight of $Al_2O_3$, the amount of $Al_2O_3$ being in excess of the amount of CaO,
(b) reinforcing a layer of tire cords formed from textile fibers of the group consisting of nylon and polyesters with said composition, and
(c) assembling one or more plies of said rubberized cords.

17. A method as defined in claim 16 wherein said finely divided CaO is in suspension in an aromatic oil in a weight ratio of about 3 to 1 respectively.

References Cited

UNITED STATES PATENTS

| | | | |
|---|---|---|---|
| 2,839,117 | 6/1958 | Clayton | 260—41.5 X |
| 2,891,595 | 6/1959 | Kuntz | 152—330 |
| 2,519,100 | 8/1950 | Baldwin. | |
| 2,724,009 | 11/1955 | Kern | 260—761 |
| 2,766,164 | 10/1956 | Salem | 161—190 |
| 2,996,468 | 10/1961 | Powers et al. | |
| 3,039,906 | 6/1962 | Baldwin et al. | 161—227 X |
| 3,179,715 | 4/1965 | Natka et al. | 260—41.5 X |

JOHN T. GOOLKASIAN, Primary Examiner

C. B. COSBY, Assistant Examiner

U.S. Cl. X.R.

117—138.8; 156—110, 334; 161—92, 227; 260—41, 41.5, 79.5, 85.3